US012556777B2

(12) United States Patent
Mathisen et al.

(10) Patent No.: US 12,556,777 B2
(45) Date of Patent: Feb. 17, 2026

(54) LIVE VIDEO RENDERING AND BROADCASTING SYSTEM

(71) Applicant: Ease Live AS, Bergen (NO)

(72) Inventors: Carl Gunnar Horn Mathisen, Søreidgrend (NO); Atle Øksendal, Nesttun (NO); Kjetil Horneland, Os (NO)

(73) Assignee: Ease Live AS, Bergen (NO)

( * ) Notice: Subject to any disclaimer, the term of this patent is extended or adjusted under 35 U.S.C. 154(b) by 0 days.

(21) Appl. No.: 17/846,234

(22) Filed: Jun. 22, 2022

(65) Prior Publication Data

US 2022/0385986 A1  Dec. 1, 2022

Related U.S. Application Data

(63) Continuation of application No. 16/963,326, filed as application No. PCT/EP2019/051760 on Jan. 24, 2019, now abandoned.

(30) Foreign Application Priority Data

Jan. 24, 2018  (EP) .................................... 18153115

(51) Int. Cl.
*H04N 21/63* (2011.01)
*H04N 21/845* (2011.01)

(52) U.S. Cl.
CPC ......... *H04N 21/63* (2013.01); *H04N 21/8456* (2013.01)

(58) Field of Classification Search
CPC ........................... H04N 21/63; H04N 21/8456
See application file for complete search history.

(56) References Cited

U.S. PATENT DOCUMENTS

| | | | |
|---|---|---|---|
| 10,101,804 B1 * | 10/2018 | Tennakoon | ............. G06F 3/167 |
| 10,536,755 B1 * | 1/2020 | Neill | ................ H04N 21/23424 |
| 2007/0079321 A1 * | 4/2007 | Ott | ......................... H04H 60/73 |
| | | | 725/135 |
| 2013/0254824 A1 * | 9/2013 | Eyer | ...................... H04N 21/84 |
| | | | 725/116 |
| 2016/0057317 A1 * | 2/2016 | Zhao | ...................... G06F 21/16 |
| | | | 348/515 |
| 2016/0193530 A1 | 7/2016 | Parker et al. | |

(Continued)

FOREIGN PATENT DOCUMENTS

WO          03044624 A2      5/2003

OTHER PUBLICATIONS

International Search Report issued by the European Patent Office acting as the International Searching Authority in relation to International Application No. PCT/EP2019/051760 dated Apr. 25, 2019 (3 pages).

(Continued)

*Primary Examiner* — Joshua D Taylor
(74) *Attorney, Agent, or Firm* — Renner, Otto, Boisselle & Sklar, LLP

(57) ABSTRACT

The present invention is related to a live video rendering and broadcasting system receiving video and data streams from at least one external source, wherein at least one source is providing one or more of video streams an contextual relevant data streams. A client component of the system is configured to provide interactive control and rendering of video streams.

18 Claims, 12 Drawing Sheets

(56) References Cited

U.S. PATENT DOCUMENTS

2018/0192080 A1* 7/2018 Henaire .............. H04N 21/236

OTHER PUBLICATIONS

Written Opinion of the International Searching Authority issued by the European Patent Office acting as the International Searching Authority in relation to International Application No. PCT/EP2019/051760 dated Apr. 25, 2019 (9 pages).
Office Action issued by the USPTO in relation to U.S. Appl. No. 16/963,326 (15 pages).

* cited by examiner

LIVE VIDEO RENDERING AND BROADCASTING SYSTEM

CROSS-REFERENCE TO RELATED APPLICATIONS

This application is a continuation of U.S. patent application Ser. No. 16/963,326, filed Jul. 20, 2020, which is a 35 U.S.C. 371 of International Application No. PCT/EP2019/051760, filed Jan. 24, 2019, which claims the benefit of European Patent Application No. 18153115.3, filed Jan. 24, 2018, the disclosure of each of these applications is expressly incorporated herein by reference in their entirety.

FIELD OF THE INVENTION

The present invention relates to a live rendering and broadcasting system comprising a client system in communication with respective broadcasting servers, and especially to a rendering and broadcasting system wherein the client system is configured to provide and execute the rendering process.

BACKGROUND OF THE INVENTION

Broadcasting live television from venues and other types or similar arrangements like for example football or baseball matches etc. includes usually more than just a live video stream wherein a reporter is commenting on line in real time about episodes happening in a game for example. Mixing graphics with live video streams happens for example when updating a current status of a football game etc. before the video stream is broadcast, or for example is distributed to select end users over the Internet. Player statistics can also appear as graphics with text when for example a football player receives a red card from a referee. The additional text and/or graphics is usually mixed with the video stream before distribution of the content. The episode of a red card may be reported by for example a journalist writing a short notice of the incident before being converted and mixed with the video stream. Player statistics can be retrieved from a database maintained by the club the actual player is a member of, a third party data provider, etc. Prior art solutions requires that the journalist and respective data bases etc. is in communication with a video mixer or studio before distributing or broadcasting the video.

In general, contextually relevant content related or associated with a part of a multimedia content being rendered may be retrieved from one or more sources, and may be mapped to data associated with the portion of the multimedia data. The mapping results in the rendering of the relevant content during the rendering of the portion of the multimedia content and is providing contextually relevant data or information for the portion of the multimedia content being rendered. Usually, the mapping information is embedded in the multimedia content.

An example of how a mapping can be achieved is disclosed in US 20130139209 A1 wherein an audio signal of the multimedia content is analyzed providing a sort of fingerprint related to respective section with specific multimedia content. When rendering the multimedia content, a system component will search for fingerprints and when a specific fingerprint is identified, a linking to associated graphics and/or data is identified and rendered together with the multimedia content of this specific portion linked via the specific fingerprint.

Live video streams may be distributed over Internet comprising graphics, and can be stored in user accessible server systems or in respective users' private computer systems etc. This enables an end user to scroll back and forth using a video player in communication over the Internet for example, or a video player application in a client accessing a computer server system storing video streams, for example from an Internet service provider, a TV station etc. The video application can for example be installed in a smart TV, in a computer system or in a hand held wireless device like a smart phone or a computer tablet etc. However, if the end user is interested in viewing once more a specific historical episode that happened during a game, prior art solutions provides no other means than rewinding and visually spotting when the episode appears in the stored video.

In general, the rendering of media content including graphics, audio, still images, video streams etc. provides a sequence of static objects on a display when broadcast as exemplified above, wherein interactive use of the media content by an end user is limited, and is usually limited to pre-programmed functionality embedded in respective video streams.

One aspect of interest are systems providing interactive television broadcasting over Internet.

U.S. Pat. No. 6,496,981 B1 A discloses a system allowing media content to be used as an interactive media program comprising:
  (a) media content in the form of successive image display frames indexed in a time sequence;
  (b) object mapping data specifying the locations of objects appearing in the display of media content which are to be rendered interactive;
  (c) linkages provided through an associated interactive media program from the objects specified by the object mapping data to interactive functions to be performed upon selection of the objects in the display; and
  (d) a user system for operating the interactive media program in conjunction with the display of the media content by selecting an object appearing in an image display frame and performing the interactive function linked thereto. The system includes an authoring system for generating the object mapping data for the media content. In a preferred interactive TV system, media content, in the form of movies, TV programs, advertising, and the like, can be presented as interactive media programs by transmitting the TV content with object mapping data ("hot spots") to a set top box connected to a viewer's TV. The TV set top box has a utility stored therein for performing the interactive functions linked to the defined hot spots in the TV content upon user selection. Interactive TV programs can also be presented using a conventional TV set top box and a remote control unit controlling the set top box. For example, if analogue video content is transmitted to the viewer on a channel provided by a cable TV company, then the object mapping data and program linkages for interactive functions can be transmitted in the video blanking intervals (VBI) interleaved with the video frames.

U.S. Pat. No. 9,330,726 B1 discloses a mobile application enabling a first sporting event spectator to efficiently record game actions and a second sporting event spectator to simultaneously record real-time video of the game actions. Using a mobile device having a touch screen, the first user can efficiently, and with limited user interaction, indicate fast paced game actions of players engaged in a sport. Using a separate mobile device, or a video system in communication with a network, the second user can record video of a presently occurring game in which the game actions occur. A system in communication with the first and second users' devices can receive indications of game actions, and receive video of the game, and associate each indicated game action with a portion of the video of the game action. The system may for example, use these associations to generate an index that enables users to view descriptions of the game actions and jump to corresponding video clips.

In general, the different aspects of handling video rendering and distribution as discussed above includes mixing and integrating and identifying possible mappings of respective episodes with a multimedia portion related to a specific episode before distributing the multimedia content.

Therefore, an end user has only a limited possibility of influencing what is displayed and distributed to him. Further, third party content may only be part of the video distribution if it is distributed to a facility providing mixing of multimedia data sources before distribution or broadcasting to end users.

Therefore, there is a need of an improved system providing more flexibility when rendering and distributing live video streams, and especially when streams includes multimedia content.

According to an aspect of the present invention, the rendering process including graphics, event data or data related to episodes, etc. is configured to be part of a client receiving separate streams of video and respective data from a supplier of respective video streams and data including third party suppliers of data of interest for a viewer, wherein the client is configured to provide visual presentations including video, text, graphics etc. ready for rendering by the client system.

OBJECT OF THE INVENTION

It is a further object of the present invention to provide an alternative to the prior art.

In particular, it may be seen as an object of the present invention to provide an improved interactive video rendering by configuring a client system to provide and execute rendering of respective video streams.

SUMMARY OF THE INVENTION

Thus, the above-described object and several other objects are intended to be obtained in a first aspect of the invention by providing a live video rendering and broadcasting system receiving video and data streams from at least one external source, wherein at least one source is providing one or more of the following video and data streams:

- a first live or delayed video stream comprising time codes is distributed to a client video storage server system storing video streams,
- a second event data stream comprising time codes is distributed to an event storage server system storing event data streams, wherein the event data comprises event parameters describing respective events, and wherein event parameters comprises time codes associated with the event, the event storage server system is storing stateful data keeping track of historical and future changes of event parameters associated with the time codes,
- a first state machine is configured in the event storage server system to receive request for event data from a second state machine configured in the client system, the first state machine distributes all future and past events that are eligible for the client system, the second state machine is filtering the received eligible events identifying which events are applicable for the client based on defined event parameters defining rules for the event, the second state machine is configured to fetch events associated with video streams associated with the received events and synchronizing the time codes of the video streams and the time code of the events, the client system is further configured to create a visual presentation including possible graphics comprised in the received stateful data of a current event based on the current time code in the video.

Respective aspects of the present invention may each be combined with any of the other aspects. These and other aspects of the invention will be apparent from and elucidated with reference to the embodiments described herein.

DETAILED DESCRIPTION OF AN EMBODIMENT

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Further, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

Figure 1:
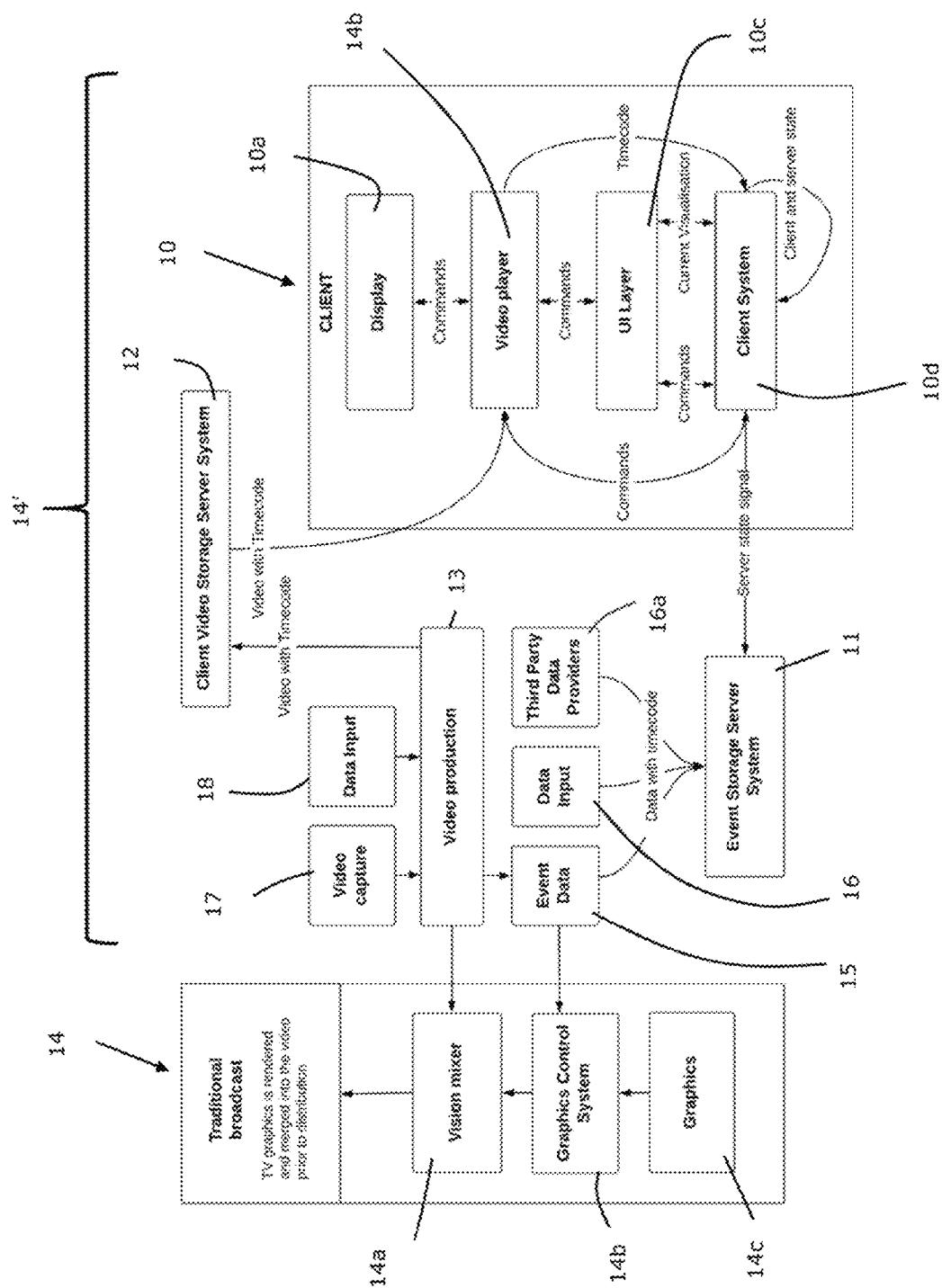
FIG. 1 illustrates an example of embodiment of the present invention.

FIG. 1 illustrates an example of a prior art broadcasting system referenced with the numeral 14. For comparison reasons, an example of embodiment of the present invention is also illustrated and referenced with the numeral 14'.

Traditional TV production receives video from respective cameras and/or from stored video sequences from other TV productions for example. In addition, text and graphics may also be included in the TV production. A TV production may be a live broadcasting from venues and other types or similar arrangements, for example football or baseball matches, concerts etc. Graphics and text in the video stream is also part of most TV productions. There exist some standards in the TV industry about how text for example may be introduced in the TV broadcasting. For example, "lower third" is defined as a graphic overlay placed in the title-safe lower area of the TV screen.

Enabling correlation and/or synchronization of respective video streams and graphics streams etc. is enabled by embedding for example a time code in the respective streams. Systems and/or apparatus processing video and data streams can then synchronize respective streams with each other based on the respective time codes.

In FIG. 1 there is an example of a video production facility 13 that may be a standard TV studio, or a mobile TV studio, used for example at a football arena when a game is played, or any other type of equipment capable of preforming similar functions. Video capture system 17 may comprise multiple cameras located for example around an arena, and there may be journalist present at a game for example making oral and/or written comments about development and episodes happening during the game. In general, this is denoted data input 18.

With reference to FIG. 1, video streams may be distributed from a traditional broadcasting system 14. The system 14 may comprise a prior art vision mixer 14a, which is a device used to select between several different video sources and in some cases composing (mixing) video sources together to create special visual effects in respective videos being broadcast to end users of the system. Audio can also be managed in a similar manner. It is also common to utilize a common universal time code for synchronizing respective video sources and video out signals generated by for example a broadcasting system 14.

The vision mixer 14a may receive graphics from a graphics control system 14b that communicate with a graphics storage system 14c, or is in direct contact with an operator generating and/or manipulating video graphics to be distributed with the output video streams.

At least one human operates normally the video production facility 13. The operator can select in real time which camera to be used and is monitoring data input 18 and decides via a video production equipment if for example text (or audio) should be embedded into the video stream.

It is important to understand that the video stream is made ready for rendering by the traditional broadcasting system 14 before submitted to end users TVs. Part of the rendering is to generate what is denoted as event data 15. For example, event data may comprise instructions sent to the graphics control system 14b instructing the controller 14b to fetch a text and/or stored graphic images from the graphics system 14c at a pre-set or given time code. Instructions at which time (time code) the text and/or graphic images is be displayed or removed is also part of event data 15.

An external supplier may also supply event data 15 instead of being generated in the video production facility 13. External operators may follow a live broadcasting of a football match for example, and make instructions, create graphics and or text etc. A combination of graphics/text and external data 18 may for example be mixed by video production facility 13. The combined result can provide specific event data 15 identified in the video production facility 13, which can convert the event data 15 into instructions and/or data submitted to for example the graphics control system 14b of the traditional broadcaster 14.

According to an example of embodiment of the present system, 14' in FIG. 1, the system 14' comprises a client 10, which is an apparatus that can be a home computer system operated by a user, or other devices like Ipads, smart phones, hand held wireless devices etc. A requirement is that the client 10 comprises a programmable computer system, or programmable device 10d configured by software to operate according to examples of embodiments of to the present invention. The client computer system 10d comprises an executable instance of software configuring the client computer system 10d to perform respective tasks according to respective aspects of the present invention. The software is downloadable over Internet from a server system configured to supply the software according to the present invention.

The client 10 comprises further at least one display 10a, a video player 10b, a graphical user interface (UI) 10c, which is an integral part of the computer system 10d. The video player 10b may be a software program acting as a video player.

According to an aspect of the present invention, video streams and event data is distributed separately to the client 10 from the video production facility 13 in contrast to the prior art solution 14 as depicted in FIG. 1. A separate video stream with time codes from the video production 13 is stored in a client video storage server system 12, and event data streams with time codes from the video production 13 is stored in an event storage server system 11. With reference to the description above, the event data may comprise external data 18.

It is important to note that the video production 13 is an optional part of the system. Any sources providing video streams with time codes and event data streams with time codes can be used with the respective event storage server system 11 and client video storage server system 12.

The executable software in the computer system 10d of the client 10 is configured to collect video and events from the individual client video storage server system 12 and the event storage server system 11. The rendering of video streams and fetching of event data is done by the configured software running in computer system 10d in the client 10. The programmable computer system 10d may be configured to start the video player 10b that can use a single time code or a series of specific timecodes to fetch video sequences from the client video storage server system 12. The same time codes can be used to fetch event data related to the current video sequence being rendered. More details is given below.

With reference to FIG. 1, data input 16 in communication with the event storage system 11 may be used the same way the data input 18 of the video production facility 13 is used. Further, third party data providers may submit data to the event storage server system 11, for example via this data input 16. However, respective data streams should be embedded with a time code. In some instances, the event storage server system 11 may be configured to simulate or regenerate a time code embedded with the respective received data streams, for example based on time of arrival to the event storage server system.

One important aspect of the present invention is that event data are stateful data. "Stateful" in computer science means that a computer or program keeps track of the state of interactions, usually by setting values in a storage field designated for that purpose. Stateless means there is no record of previous interactions and each interaction request has to be handled based entirely on information that comes with the request. In the context of the present invention, stateful data comprises keeping values of parameters associated with events at every time code a parameter value is changed. For example, in a football match a score bug (which is a digital on-screen graphic displayed on a specific part of a TV screen during broadcast of a sporting event) can be "1-0" at a given time, which is associated with a first specific time code in the video. After a while, there is another scoring in the match. The parameter score bug is then updated for example to "1-1" associated with a second time code. If the parameter score bug is treated as an ordinary parameter, the parameter value of the score bug will change from "1-0" to "1-1", and the association between the first time code and the historical event of the "1-0" is lost from the event data. This is an example of stateless data. The event storage server system is configured to store the event comprising the score bug "1-0" associated with the first time code, and the event comprising the score bug "1-1" associated with the second time code.

This implies for example that a user, for example using the graphical user interface 10c of the computer system 10d can search backwords (or forward) in the event storage server system 11 for the event wherein the score bug is equal to for example "1-0". The parameter value of this event is associated with a specific time code (or an interval of specific time codes) as discussed above. This enables the client system 10 to fetch the time codes associated with the event "1-0", and use the time code or time code interval associated with the event to fetch out from the client video storage server system the video sequence comprising the situation wherein the scoring results in the score bug is "1-0".

A further aspect of stateful data is that the example of using the graphical interface 10c to search for the specific score bug value is in itself an interaction that is kept stateful in the system. When searching backwards for example for a specific event in the video stream, the current viewing may be aborted by the user. This can also happen during a live broadcasting. The event of aborting the current viewing is recorded as an event and is also qualified with the user identity. That implies that this specific event is only related to the specific user even if it is stored in the event storage server system accessible by all users. When the user finishes viewing the video sequence comprising the "1-0" situation, this is a new stateful event and the state of his viewing is changed back to the video time code where the user aborted the current viewing. This is only possible since the data are stateful.

The technical effect of the example of embodiment of the present invention is a result of the architecture of the system comprising separating video streams from event data streams affecting or tailoring the rendering of respective video streams.

Therefore, the communication between the event storage server system 11 and a client computer system 10d comprises changing states, and the changing of states can be subject to further conditions, for example the user identity.

According to an aspect of the present invention there is a first state machine 1 configured in the event storage server system 11 in communication with a second state machine 2 configured in the computer system 10d of the client 10. State machine 1 in the event storage server system 11 is configured to handle inbound events from any source being part of a video stream being rendered in clients 10. The state machine 2 is configured to enable a client 10 to determining which events from the state machine 1 is applicable for the client at a specific time.

The state machine 1 in the event storage server 11 is sending past and future events that are associated with the current time or clock in the client (time code). When a client 10 receives events it is guaranteed that the events are eligible to be executed in a respective client. However, this does not imply that an event is applicable to be executed in the context of a specific client. The state machine 2 configured in the client computer system 10d determines if the event is applicable to be executed in the specific client 10. Verified events are then executed by the state machine 2 when a defined timecode parameter value of the event matches against the current time in the client. Refer FIG. 8 and FIG. 9 for more details.

It is important to have in mind that a source can be a video production facility that may include human control of the production of video streams. In addition respective clients can modify for example information being viewed on their own display. Events can be unique for each client and a client can receive events from the event storage server system 11 and also create and send events to the event storage server system 11. Further details is given below.

A client 10 is further configured to update the visual presentation including graphics that may be included in the received stateful data when new events, or changes is identified in existing displayed events as recorded in the requested stateful event data from the event storage server system.

The event storage server system 11 is further configured to create a common data format of respective received data with a time code. The common data format is adapted to the client 10 that can read out event data.

The client 10 do not need to receive all event data and complete video streams of a specific video. Instead, the video player can use the time code to fetch event data one at a time correlated with the time code together with video images one at a time from the client video storage server system. Based on stateful event data, information and/or instructions, and/or user interaction via the graphical user interface (UI) 10c, the client system is further configured to create a visual presentation including graphics that may be comprised in the received stateful data of a current state based on the current time code in the video.

Figure 2:
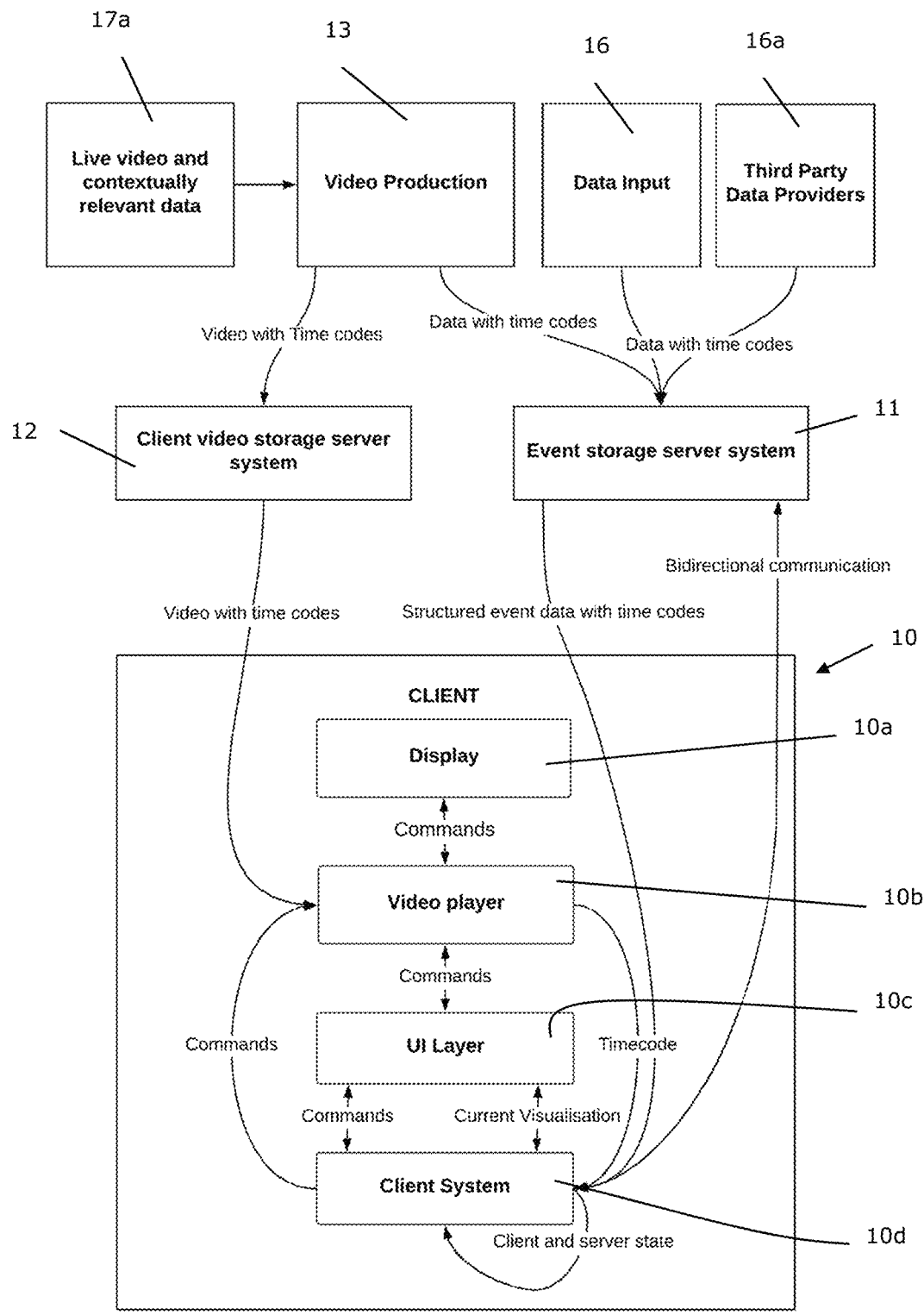
FIG. 2 illustrates further details of the example of embodiment disclosed in FIG. 1.

FIG. 2 illustrates the example of embodiment of the present invention illustrated in FIG. 1, but without the example of a prior art solution present.

A video production facility 13 receives live video and contextual relevant data. Based on these streams, the video production facility 13 is distributing video to at least one client video storage system 12 and event data based at least on the contextual relevant data 17a is distributed to an event storage server system 11.

The video production facility 13 is optional. An alternative is that the client video storage server system is configured to receive video streams directly, and may be configured with a front end implemented vision mixer. Such a vision mixer may be controlled by a robot that also can be implemented in the video client storage server system 12. Event data 17a, data input 16, third party data 16a may be supplied by at least one external source as discussed above.

In an example of embodiment of the present invention, the event storage server system 11 is configured to create a common data format comprising a subset of consecutive time codes. Such a data item is denoted a timeslot and is correlated with the time codes. In this respect, a timeslot may comprise more than one event.

In an example of embodiment of the present system, the client 10 processes one timeslot after the other.

Figure 3:
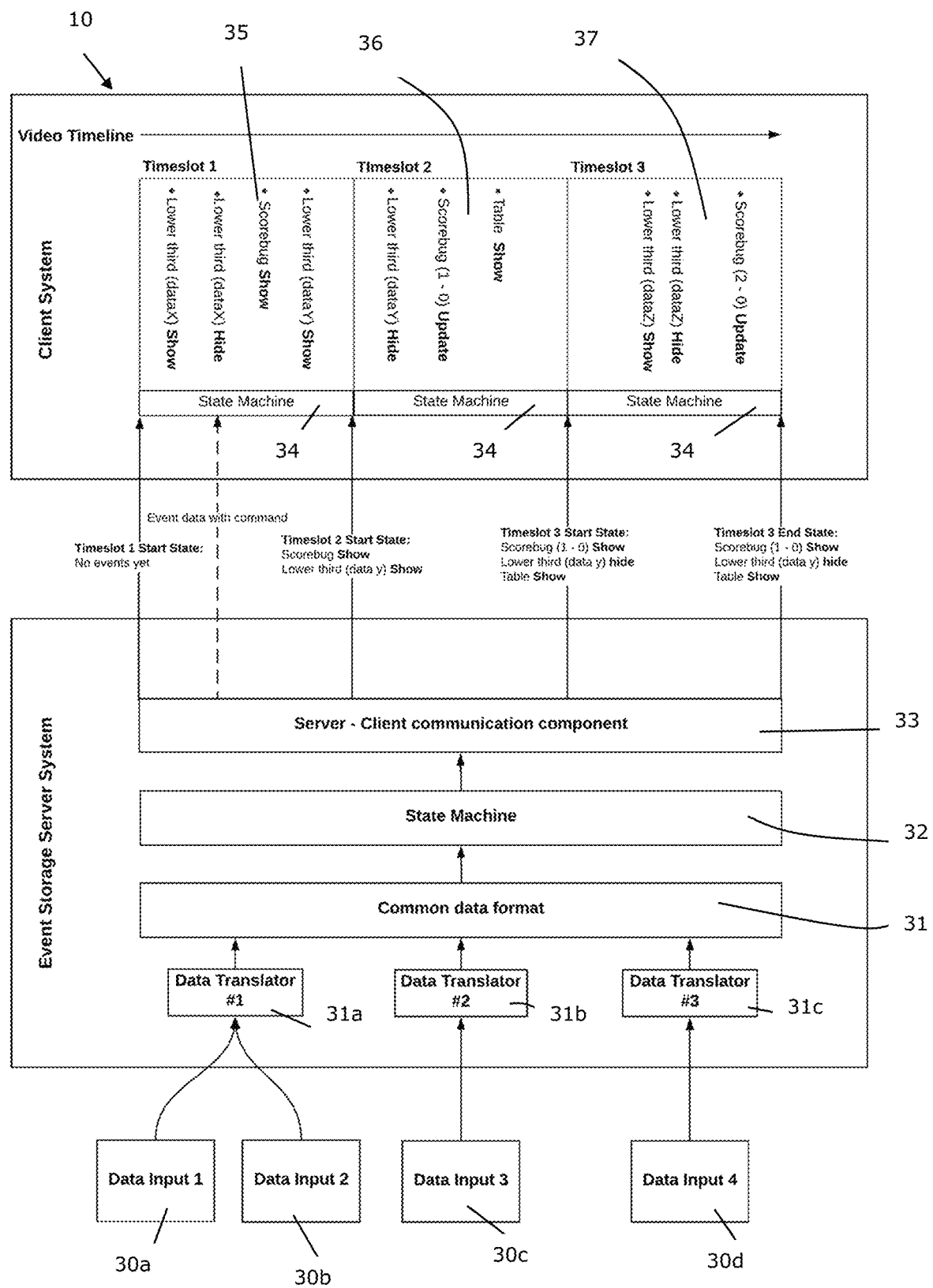
FIG. 3 illustrates an example of dataflow in the example of embodiment disclosed in FIG. 1.

FIG. 3 illustrates an example comprising three timeslots. At the bottom it is illustrated how respective data inputs 30, 30a, 30b and 30c is in communication with data translators 31a, 31b, 31c translating data thereby making it possible to create a common data format 31.

In the example disclosed in FIG. 3, a first state machine 32 is configured in the event storage server system 11 being in bidirectional communication with a second state machine being configured in the client computer system 10d.

There is a client/server communication component 33 in the system interconnecting signalling between the first and second state machine.

An example of a generic process flow in a state machine is disclosed in FIG. 6 discussed below.

When a client 10 is processing a timeslot, event data is processed. In timeslot 1 (reference numeral 35) in FIG. 3, a parameter "lower third" is set to a state displaying the content of the "lower third" parameter by the command "show" at a first timecode point in timeslot 1. At a later timecode point in timeslot 1, another command "hide" will hide the content of the "lower third" parameter from being displayed.

Another parameter "Score bug" is set to a state displaying the content of the parameter "Score bug" by the command "show". In the second timeslot 2 (reference numeral 36) the parameter "lower third" is set to state "hide". At a later timecode point, the parameter "Score bug" is set to an updated state by the command "update". At a later timecode point, a table is set to state "Show", i.e. being displayed.

In a third timeslot 3 (reference numeral 37) the parameter "lower third" is set to state "show", then to "hide" and parameter "Score bug" is set to state "update".

The respective states are changed by signalling from the second state machine 34 configured in the client 10. Respective signals that cause the second state machine to change state stems from at least two sources. One source is the event data received from for example a video production facility 13, or an external supplier of data. The first state machine is configured to signal the second state machine when states changes. A second source is the second state machine in the client 10, which is configured to receive input via the user interface layer (UI) 10c configured and executed in the client computer system 10d. The graphical interface layer 10c is configured to signal the second state machine to change at least one state.

In addition, the event storage server system 11 is configured to create stateful data and store historical stateful data. Therefore, the second state machine may signal the first state machine of such state changes and record them in the server. All these actions are correlated with the time code that drives the rendering forward when the video player 10b issues time codes to the video storage server system 12 and the event storage server system 11.

Figure 4:
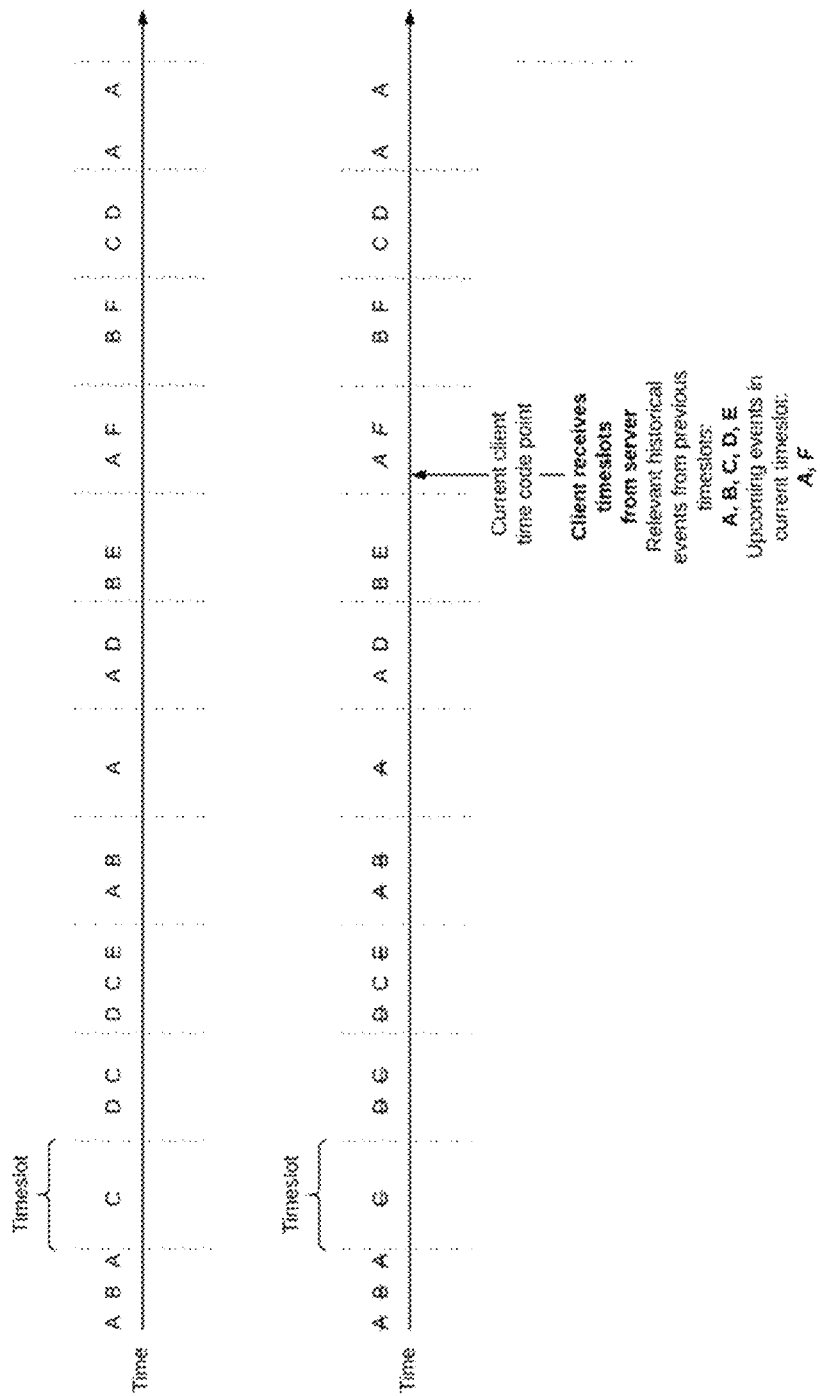
FIG. 4 illustrates an example of stateful data according to the present invention.
Figure 5:
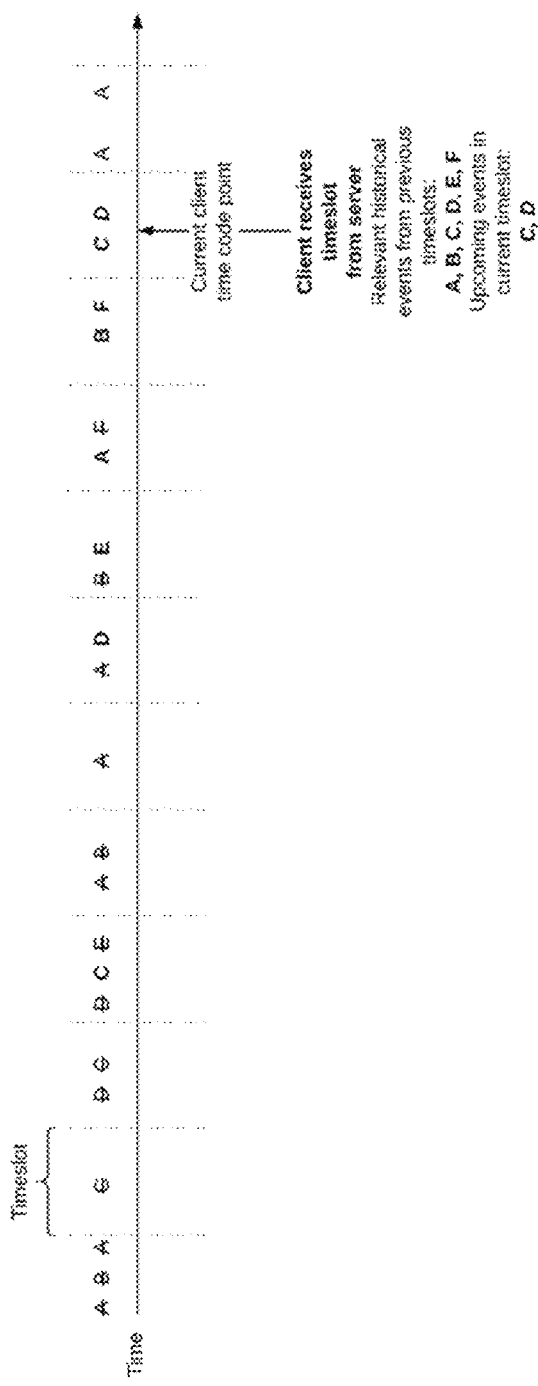
FIG. 5 illustrates an example of stateful data according to the present invention.

FIG. 4 illustrates how different states A, B, C, D may appear in different timeslots, both historical timeslots, i.e. timeslots that has been processed or rendered as well as future timeslots to be rendered. In the lower part of FIG. 4, it is indicated a current client time code point (for example a timecode from the video player). The client 10 receives the timeslot and relevant historical events from previous timeslots in addition to current events are processed. FIG. 5 illustrates a similar situation.

Figure 6:
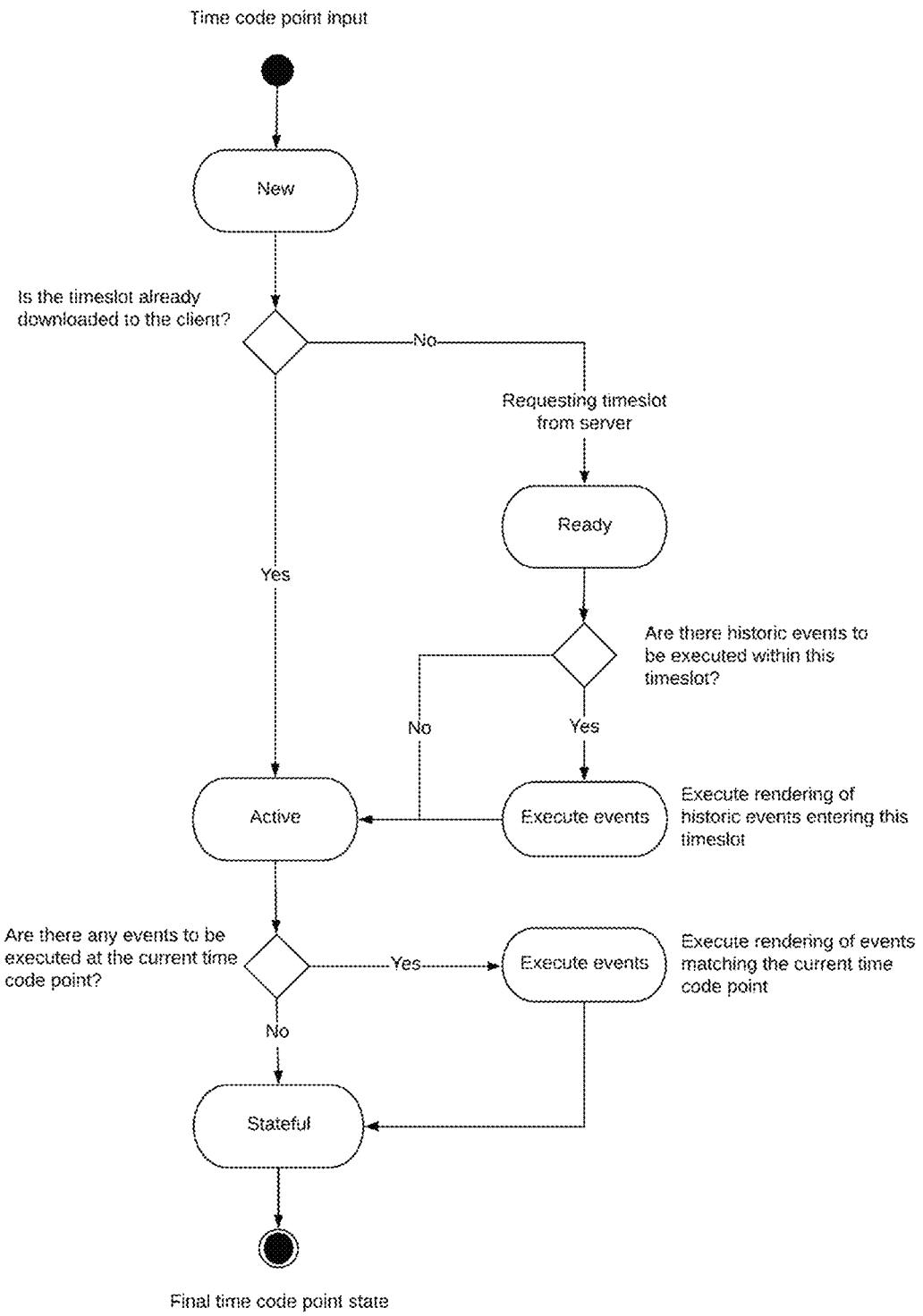
FIG. 6 illustrates further details of the example of embodiment illustrated in FIG. 1.

FIG. 6 illustrates an example of process flow in an example of a second state machine according to the present invention. At a current code point a new process starts. The first test is to identify if the requested timeslot is already downloaded or not. If not, the timeslot is requested by the second time machine. Then a test if historical events are to be executed within this timeslot is performed. Then a rendering of all events starts in this timeslot.

Below is an example of code of an event. Clock #show describe that the clock is starting. In this example, a unix timestamp is used. The timestamp gives the number of seconds from 1 Jan. 1970. PlayByPlay #show disclose a free throw in a football match.

```
{
    "event": "Clock#show",
    "metadata": {
        "gameClock": "03:35",
        "period": 4,
        "running": true,
        "shotClockValue": 24000,
        "value": 215000
    },
    "timestamp": 1514958565200,
    "programId": "0021700553",
    "createdTime": "2018-01-03T05:49:25.490Z",
    "id": "9f65152a-8418-4ed7-a21a-0cfdbcefea6a"
},
{
    "event": "PlayByPlay#show",
    "metadata": {
        "description": "[LAC 103-96] Williams Free Throw 2 of 2 (31 PTS)",
        "eventType": "free throw",
        "gameClock": "03:35",
        "id": 603,
        "period": 4,
        "personId": 101150,
        "pts": 1,
        "scoreAway": 96,
        "scoreHome": 103,
        "team": "home",
        "teamId": 1610612746
    },
    "timestamp": 1514958572169,
    "programId": "0021700553",
    "createdTime": "2018-01-03T05:49:32.169Z",
    "id": "5c2731fc-a43d-4918-ba2b-265ea029c19c"
},
```

Figure 7:
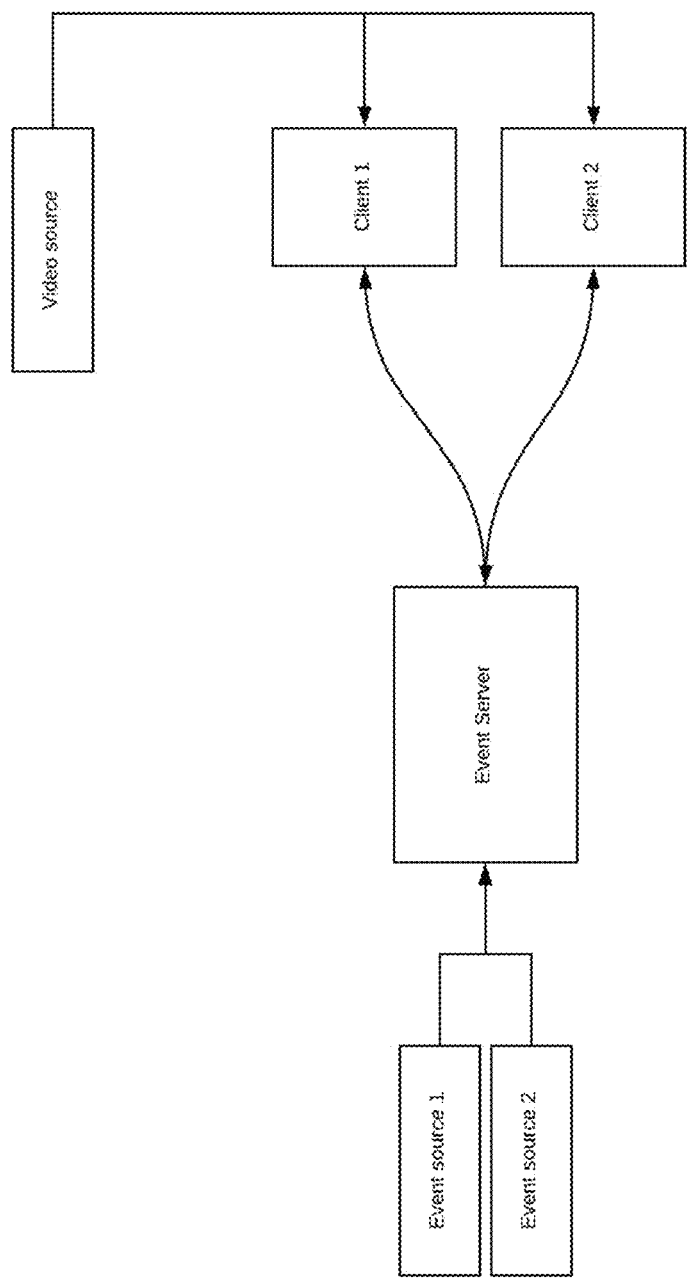
FIG. 7 illustrates further details of the example of embodiment illustrated in FIG. 1.

FIG. 7 illustrates a first and a second client 10 receiving video streams from an external source. The external source may be video streams from a video production facility 13, or any other source as discussed above.

The client 1 and client 2 is in communication with a common event storage server system 11.

Video streams and event data is presented at the same time to a client 10 at a same time. A user of the first client 1 and a user of the second client 2 may both have started streaming a same video or different videos. The time of presenting the videos and event data to the first client 1 and the second client 2 can be different since it is the time code issued by the respective first client 1 and the second client 2 that drives the rendering locally in each respective client.

The video streams and event data are synchronized by a shared time reference, for example a universal time code from a video production facility. Then the recorded time codes on respective servers can be synchronized.

A client will receive state parameters from the event storage server 11. Events and state parameters is processed with time synchronization by the client computer system 10*d*. The client computer system 10*d* is then configured to render correct presentations of events in live or historic settings.

The aspect of using a user identity as part of events enables a first user of the first client 1 to make his own unique presentation via his own graphical user interface 10*c* compared to a second user of the second client 2 even if they are viewing the same video stream.

The example of embodiment of the present invention disclosed above uses state parameters comprising a set of values describing an event. Here is a non-limiting example:

An event executes at time reference.
An event terminates at time reference.
Condition: Phone only, i.e. a smart phone is the only allowed device a user can utilize when viewing videos.
Condition: Norway, i.e. a user can only view the displayed content in Norway.
An event has been executed at time reference.
An event has been terminated at time reference.

The first client 1 and second client 2 can receive and send events (set respective event parameters describing an event) to the event server 11.

The event server 11 is configured to organise and store received events including storing events with at least time codes.

Events are distributed from the event server 11 to the first client 1 and the second client 2.

Figure 8:
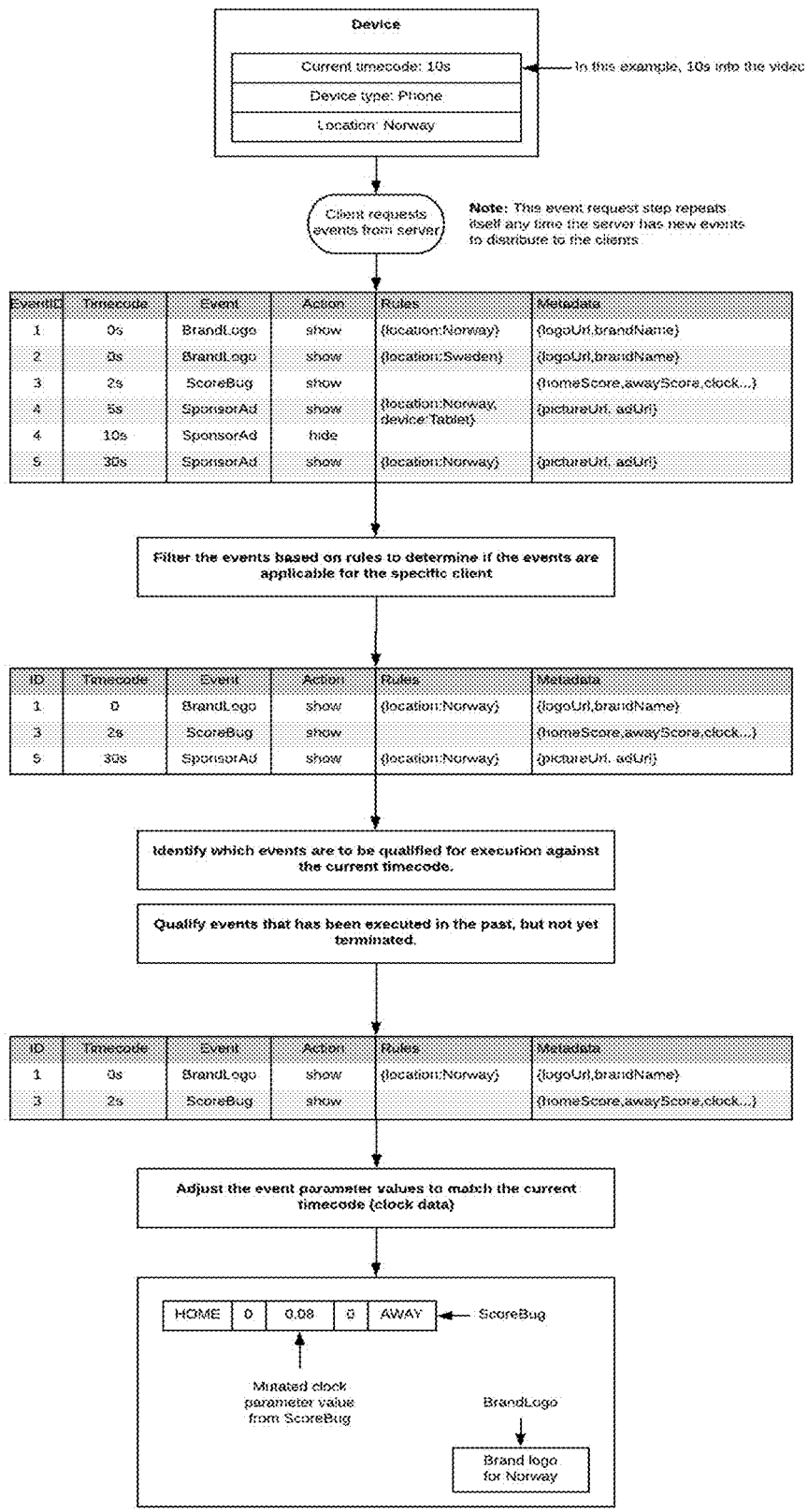
FIG. 8 illustrates an example of handling events in the example of embodiment illustrated in FIG. 1.

FIG. 8 illustrates an example of process flow of an event. The device is at a current time code of 10 seconds into the video. The device is a phone and the location is Norway. The client may for example request events from the event server 11. A table comprising event identity (event ID) and a list of time codes associated with the respective event IDs. The action to be performed is also listed and rules. For example a rule is that an event ID is associated with the location Norway, which indicate that the action of the event can only be executed in Norway.

Any event requested is filtered based on rules determining if the events are applicable for the specific client. The client ID (not illustrated) is also part of events as discussed above.

The result of the filtering result in an event list comprising event ID 1, 3 and 5 as illustrated in FIG. 8.

The next step is to verify which events are qualified by the time code to be executed. This is a new filtering process based on the time code specified for the respective events.

The result is that events with the event ID 1 and 3 are qualified to be rendered. One feature is that the time code may be used to adjust event parameter values.

Figure 9:
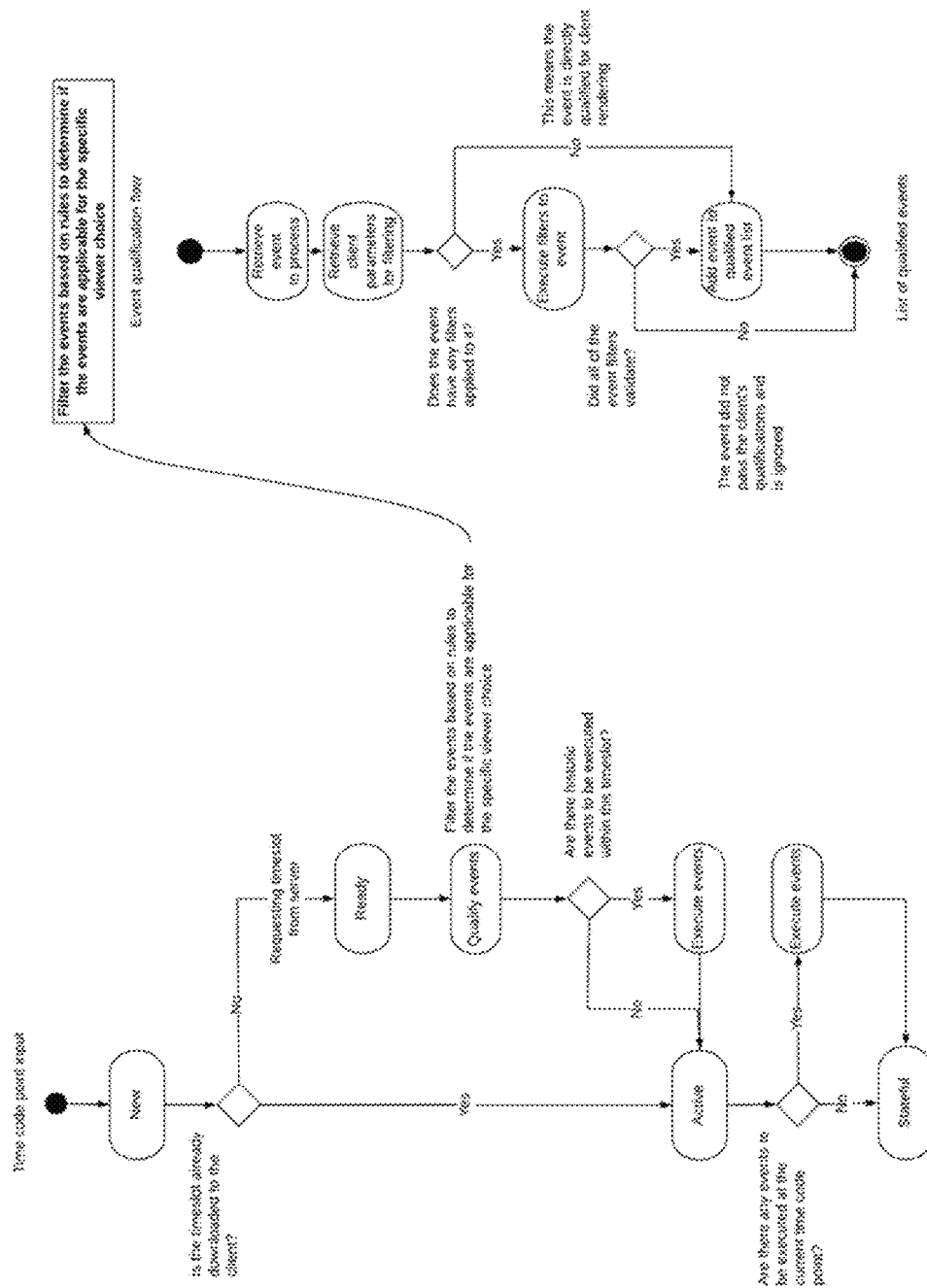
FIG. 9 illustrates flow diagrams of examples of in the example of embodiment illustrated in FIG. 1.

FIG. 9 illustrates the flow of timecodes and events in a client 10 like the operations illustrated in FIG. 8. The input parameter in FIG. 9 is a timeslot (a collection of consecutive time codes). The first test is to verify if the timeslot already is downloaded or not. If the timeslot is downloaded the timeslot is active (i.e. execute event parameters at respective time codes of the timeslot). If the timeslot is not downloaded the timeslot is requested. The next step is to qualify the event by filtering the event as disclosed in FIG. 8. The output of the process is a list of qualified events.

Figure 10:
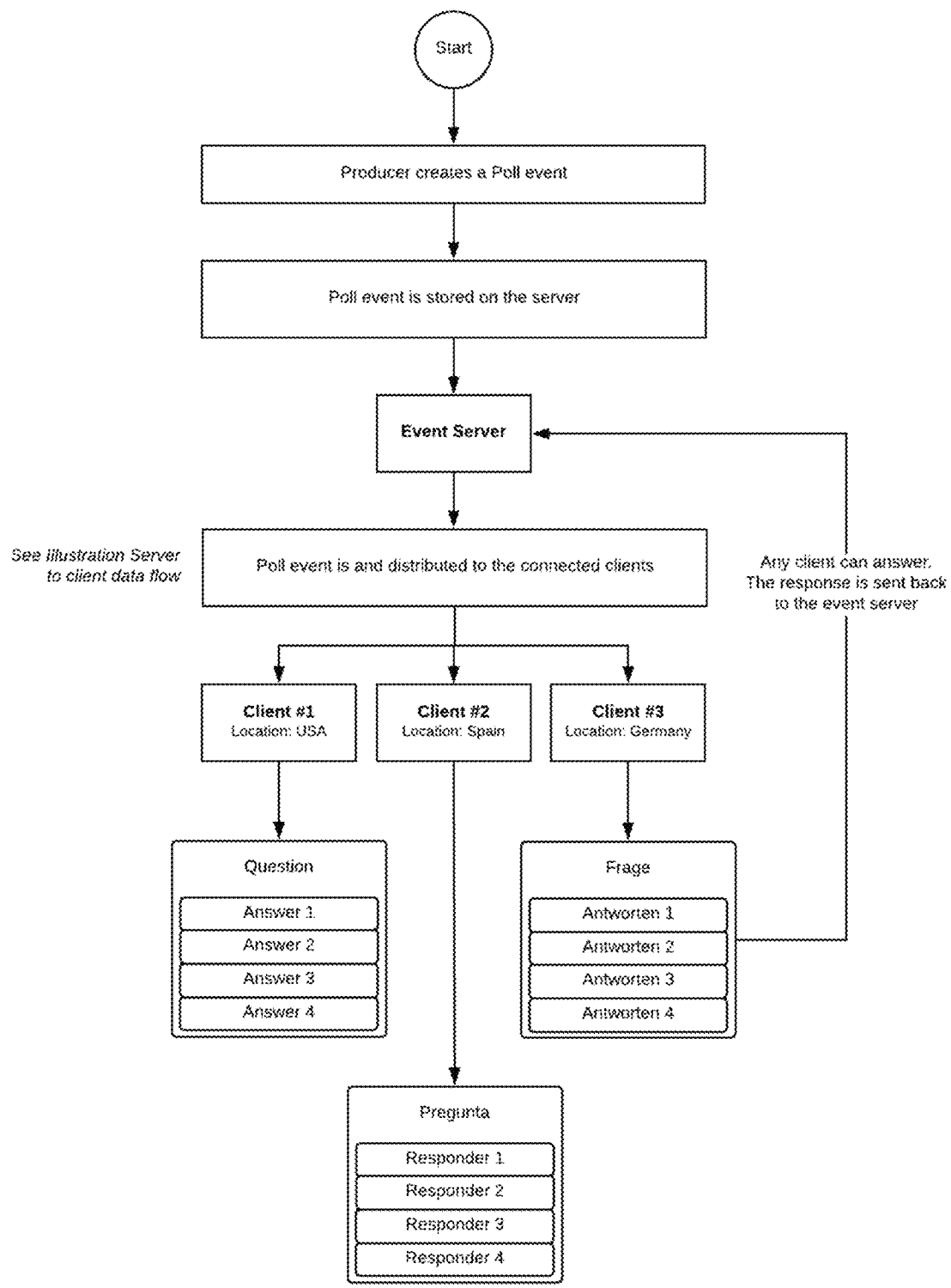
FIG. 10 illustrates an example of method steps when creating an example of event.

FIG. 10 illustrate a situation wherein a producer creates a poll event (i.e. submitting questions to viewers and is collecting answers. A poll event is stored in the event storage server system 11. A first client is located in USA, and second client is located in Spain and a third client is located in Germany. The poll event for USA will then have an event parameter identifying USA and the language used for the questions and answers from the client will automatically be submitted and received in English. The same applies for the events for Spain and Germany that will respectively be submitted and received in Spanish and German. The response from each client is sent back to the event server from each respective client creating an event.

Figure 11:
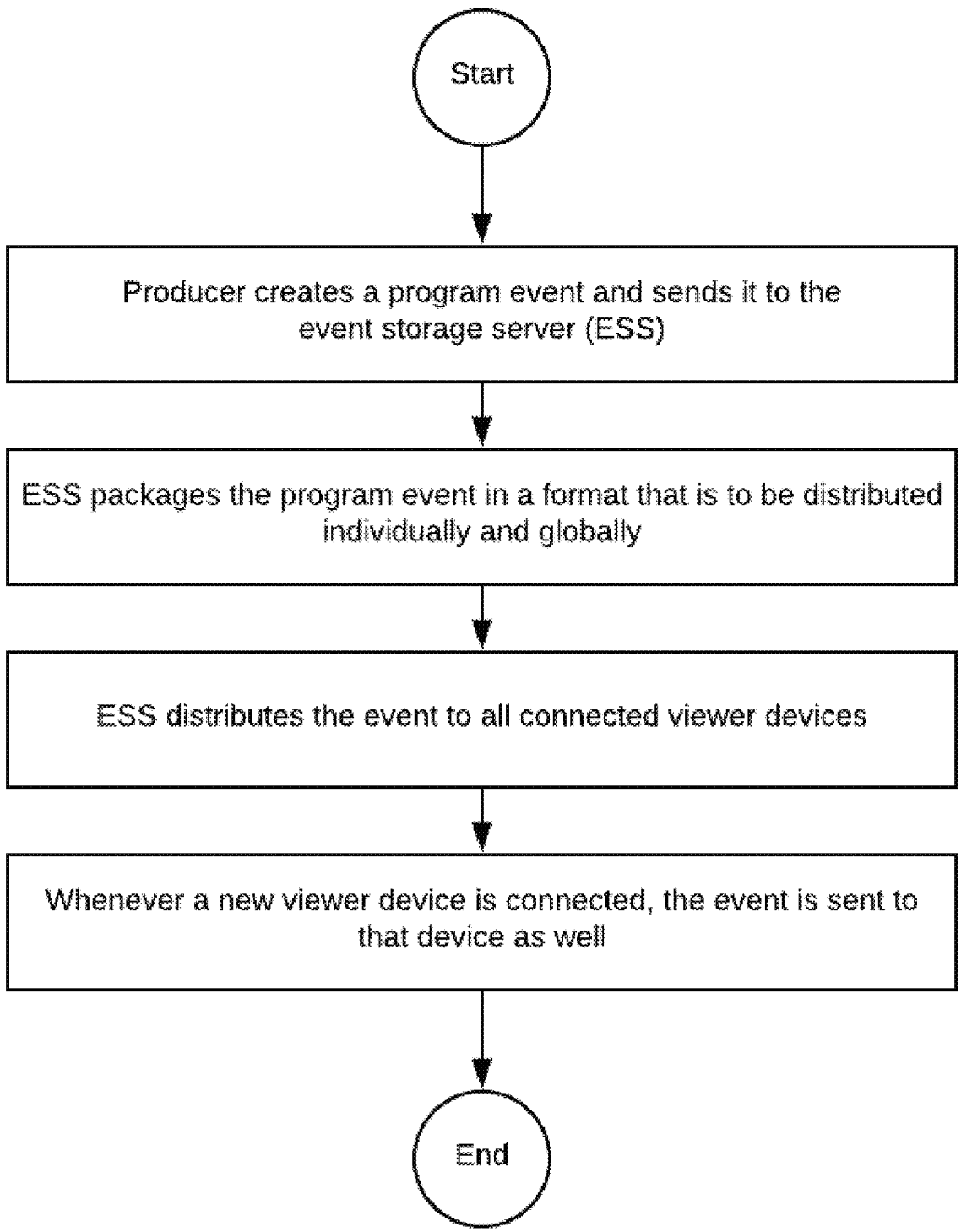
FIG. 11 illustrates an example of method steps when creating an example of an event.

Another example is illustrated in FIG. 11. A producer creates and event and send the event to the event storage server 11. The event storage server 11 is configured to package and format the event that can be distributed individually and b globally to connected viewer devices (i.e. clients 10). Whenever a new viewer is connected, the event is sent to this device as well.

Figure 12:
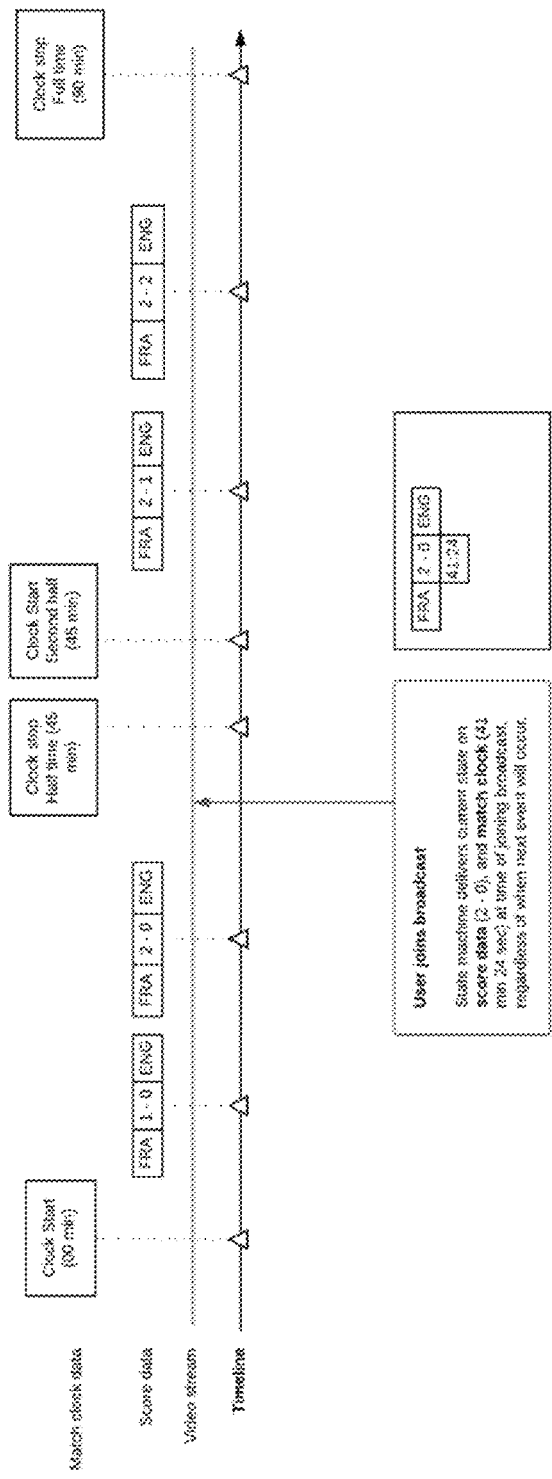
FIG. 12 illustrates an example of events related to a football match.

FIG. 12 illustrate respective timelines of a football match between France and England. There is a clock for the match itself (two periods of 45 minutes each), video stream timeline and a timeline for the events, for example, events describing the scorebug as discussed above.

It is further within the scope of the present invention to implement the first state machine and the second state machine as state machines comprising more than one state machine.

According to an example of embodiment of the present invention, a live video rendering and broadcasting system receiving video and data streams from at least one external source, wherein at least one source is providing one or more of the following video and data streams:

a first live or delayed video stream comprising time code is distributed to a client video storage server system storing video streams,
a second event data stream comprising time code is distributed to an event storage server system storing event data streams,
a third party data stream comprising time code is distributed to the event storage server system storing third party data streams,
the event storage server system is configured to parse incoming second and third data streams and structures data streams from respective sources into one common format, thereby organizing data as stateful and/or un-stateful events comprising time codes,
the at least one client system comprising a video player is configured to request stateful event data from the event storage system based on time codes submitted from the video player and creating stateful data of incoming event data,
the at least one client system is further configured to synchronize video time codes with the event data time codes,
the at least one client system is further configured to create a visual presentation including graphics comprised in the received stateful data of a current state based on the current time code in the video,
the at least one client system is further configured to update the visual presentation including graphics included in the received stateful data when new events, or changes to existing displayed events, occur in the requested stateful event data from the event storage server system.

According to an example of embodiment of the present invention, a live video rendering and broadcasting system may be receiving video and data streams from at least one external source, wherein at least one source is providing one or more of the following video and data streams:

a first live or delayed video stream comprising time codes is distributed to a client video storage server system storing video streams,
a second event data stream comprising time codes is distributed to an event storage server system storing event data streams, wherein the event data comprises event parameters describing respective events, and wherein event parameters comprises time codes associated with the event, the event storage server system is storing stateful data keeping track of historical and future changes of event parameters associated with the time codes, a first state machine is configured in the event storage server system to receive request for event data from a second state machine configured in the client system, the first state machine distributes all future and past events that are eligible for the client system, the second state machine is filtering the received eligible events identifying which events are applicable for the client based on defined event parameters defining rules for the event, the second state machine is configured to fetch events associated with video streams associated with the received events and synchronizing the time codes of the video streams and the time code of the events, the client system is further configured to create a visual presentation including possible graphics comprised in the received stateful data of a current event based on the current time code in the video.

Further, the system may be configured to rendering video streams and execute events based on consecutive timeslots, wherein a timeslot comprises multiple time codes.

Further, a timeslot may comprise more than one event.

Further, the first state machine may be configured to signal the second state machine according to the state of the stateful data being distributed from the event storage server system, and the second state machine is configured to signal the first state machine based on the state of the stateful data of the received event data.

Further, the second state machine may be configured to change state according to event data comprised in a first received timeslot, and is configured to signal the first state machine of a second timeslot to be a next consecutive time slot to be processed.

Further, the first and second timeslot may comprise recorded historical events from the event storage server system.

Further, the first and second timeslot may comprise future events defined in the event storage server system.

Further, the first time slot or the second timeslot may comprise an event identified by a parameter name, wherein the first state machine is configured to search for events comprising the parameter name.

Further, the second timeslot may be requested based on a time code from a video player being part of the client system.

Further, the client system may comprise a display configured with a graphical user interface enabling a user of the client to create his own events, wherein the client system is configured to send the event parameters defining the user created event to the event storage server system.

Further, a time code may comprise at least one of the following time code formats or protocols:
  a. a coordinated universal time (UTC),
  b. a linear time code (LTC),
  c. a vertical interval time code (VITC),
  d. a precision time protocol (PTP),
  e. a network time protocol (NTP),
  f. a global positioning system (GPS), or
  g. an internet protocol system.

Further, the event storage server system may configured to convert different time codes in different video and/or data streams to a common time code when structuring time slots comprising multiple time codes.

Further, event parameters may comprise parameters like:
execute an event time reference;
terminate an event at time reference;
event has been executed at reference time;
event has been terminated at reference time;
Condition: condition identifier;

Further, a condition identifier may be country name, device type and similar condition identifiers.

Further, the system may be configured to record and time coding third party video streams according to the time code used in the system, and store the qualified video streams in the client video storage server system.

Further, the system may be configured to record and time coding third party event data streams according to the time code used in the system, and store the qualified event data streams in the event storage server system.

The invention claimed is:

1. A video rendering system, comprising:
a video storage server storing a video stream, the video stream comprising one or more video frames having associated video time codes;
an event storage server storing a state machine, the state machine including stateful event data associated with one or more events, wherein, for each of the events, the stateful event data includes:
a parameter associated with the video stream;
a change in a state of the parameter;
an event time code associated with the event, wherein the event time code is correlated with the video time codes;
one or more rules; and
instructions to fetch a text and/or graphic image associated with the event, and
a client system, comprising a display configured with a graphical user interface enabling a user of the client system to create user created events, wherein the client system maintains a client version of at least one parameter corresponding to the event data, and wherein the client system is configured to:
receive, from the video storage server, at least a portion of the video stream;
extract, from the video stream, at least one video time code;
request, from the event storage server, stateful event data based on the extracted video time code;
send stateful event data corresponding to one or more user created events to the event storage server, wherein the stateful event data corresponding to the one or more user created events includes a rule dictating a user identity condition;
receive, from the event storage server, stateful event data corresponding to one or more qualified events that are qualified to be rendered by the client based on the request, wherein the stateful event data corresponds to two or more timeslots, including a current timeslot and at least one historical timeslot occurring prior to the current timeslot;
filter the one or more qualified events to determine which user created events are applicable for the client based on a defined user identity condition for each event;
execute the one or more qualified events, wherein executing the qualified events includes:
executing the qualified events corresponding to each of the at least one historical timeslot; and then sequentially executing the qualified events corresponding to the current timeslot based on the event time code of the qualified events, in synchronization with the video time codes of the video stream;

and wherein executing each of the one or more qualified events includes:

carrying out the instructions specified in the qualified event to fetch the text and/or graphic image; and modifying a client version of the corresponding parameter; and generate a visual presentation corresponding to the modified parameter, wherein generating the visual presentation includes generating the visual presentation for the at least one historical timeslot including modifying the visual representation to incorporate the fetched text and/or graphic image, wherein a reception time of the stateful event data occurs in a time period before a time at which the visual presentation is generated, and wherein the applicable user created events enable the modified visual presentation to be unique as compared to a second visual presentation generated by a second client system.

2. The system of claim 1 wherein, for at least some of the events, the stateful event data stored in the event storage server includes:

a parameter associated with the video stream;
a value for the parameter; and
an event time code associated with the corresponding event, and wherein executing such events includes:

creating a client version of the parameter; and
setting the parameter to correspond to the status indicated in the stateful event data.

3. The system of claim 1 wherein the client system is configured to execute the qualified events in order based on the respective event time codes of the qualified events, beginning with the earliest event time code.

4. The system of claim 1 wherein the client system is configured to execute the qualified events in order based on the respective event time codes of the qualified events, beginning with the earliest event time code, and in synchronization with the video time codes of the video stream.

5. The system of claim 1 wherein the request identifies one or more timeslots based on the extracted video time code, including at least one future timeslot.

6. A method of transmitting event data related to a video stream, the method comprising:

storing, at a video storage server, a video stream, the video stream comprising one or more video frames having associated video time codes;

storing, at an event storage server, a state machine, the state machine including stateful event data relating to one or more events, wherein the stateful event data for each event includes:

a parameter associated with the video stream;
data relating to a state of the parameter;
an event time code associated with the event, wherein the event time code is correlated with the video time codes;
one or more rules; and
instructions to fetch a text and/or graphic image associated with the event, and transmitting, to a client system, at least a portion of the video stream to the client system;

receiving, from the client system, a request for stateful event data based on a video time code associated with the portion of the video stream transmitted to the client system; and transmitting, to the client system, stateful event data corresponding to one or more qualified events that are qualified to be rendered by the client system based on the request, and wherein the qualified events are rendered during a time period after a transmission time of the stateful event data, wherein:

the stateful event data corresponds to two or more timeslots, including a current timeslot and at least one historical timeslot occurring prior to the current timeslot;

at least one of the qualified events is a user created event with corresponding stateful event data that includes a rule dictating a user identity condition; and the stateful event data is sufficient to, at the client system:

filter the one or more qualified events to determine which user created events are applicable for a user of the client based on a defined user identity condition for each event;

execute the one or more qualified events, wherein executing the qualified events includes:

executing the qualified events corresponding to each of the at least one historical timeslot; and then sequentially executing the qualified events corresponding to the current timeslot based on the event time code of the qualified events, in synchronization with the video time codes of the video stream;

and wherein executing each of the one or more qualified events includes:

carrying out the instructions specified in the qualified event to fetch the text and/or graphic image; and modifying a client version of the corresponding parameter; and generate a visual presentation corresponding to the modified parameter, wherein generating the visual presentation includes generating the visual presentation for the at least one historical timeslot including modifying the visual representation to incorporate the fetched text and/or graphic image, wherein a reception time of the stateful event data occurs in a time period before a time at which the visual presentation is generated, and wherein the applicable user created events enable the modified visual presentation to be unique as compared to a second visual presentation generated by a second client system.

7. The method of claim 6 further including, prior to transmitting the stateful event data, verifying the qualified events by comparing the event time code for one or more events with the time code specified in the request.

8. The method of claim 6 wherein the request identifies a timeslot including the video time code and wherein the stateful event data corresponding to one or more qualified events includes a plurality of events having event time codes during the timeslot.

9. The method of claim 8 further including, prior to transmitting the stateful event data, verifying the qualified events by comparing the event time code for one or more events with time codes corresponding to the timeslot.

10. The method of claim 6 wherein the request identifies a plurality of timeslots, including at least one historical timeslot, and wherein the stateful event data corresponding to one or more qualified events includes a plurality of events having event time codes during any of the timeslots.

11. The method of claim 6, wherein the method includes, prior to transmitting the stateful event data, filtering the events based on the at least one of the rules to produce a filtered event list.

12. The method of claim 11 wherein filtering the events includes comparing a condition identified in at least one of the rules with a characteristic of the client system.

13. The method of claim 11 wherein the request identifies a timeslot including the extracted video time code and wherein the method further includes, prior to transmitting the stateful event data, verifying the events in the filtered event list to identify the qualified events by comparing the event time code for one or more of the events in the filtered event list with time codes corresponding to the time slot.

14. A video rendering method, the method comprising:
receiving, from a video storage server, at least a portion of a video stream;
extracting from the video stream at least one video time code;
requesting, from an event storage server, stateful event data corresponding to the extracted video time code;
receiving, from the event storage server, stateful event data corresponding to one or more qualified events, wherein the stateful event data corresponds to two or more timeslots, including a current timeslot and at least one historical timeslot occurring prior to the current timeslot, and wherein at least one of the qualified events is a user created event with corresponding stateful event data that includes:
a parameter associated with the video stream;
a change in a state of the parameter;
an event time code associated with the event, wherein the event time code is correlated with the video time codes;
a rule dictating a user identity condition; and
instructions to fetch a text and/or graphic image associated with the event;
executing the qualified events, wherein executing the qualified events includes:
filtering the one or more qualified events to determine which user created events are applicable based on a defined user identity condition for each event;
executing the qualified events corresponding to each of the at least one historical timeslot; and then
sequentially executing the qualified events corresponding to the current timeslot based on the event time code of the qualified events, in synchronization with the video time codes of the video stream;
and wherein executing each of the one or more qualified events includes:
carrying out the instructions specified in the qualified event to fetch the text and/or graphic image;
modifying a local version of a parameter corresponding to a parameter identified in the qualified event; and
generating a visual representation corresponding to the modified parameter, wherein generating the visual presentation includes generating the visual presentation for the at least one historical timeslot including modifying the visual representation to incorporate the fetched text and/or graphic image, wherein a reception time of the stateful event data occurs in a time period before a time at which the visual presentation is generated, wherein the applicable user created events enable the modified visual presentation to be unique as compared to a second visual presentation.

15. The method of claim 14 wherein:
requesting stateful event data includes determining a timeslot based on the extracted video time code and identifying the timeslot in the request; and
executing the qualified events includes executing the qualified events in order based on the respective event time code of the qualified events, beginning with the earliest event time code, and in synchronization with the video time codes of the video stream.

16. The method of claim 14 wherein:
requesting stateful event data includes determining two or more timeslots based on the extracted video time code, including a current timeslot and at least one historical timeslot and identifying the two or more timeslots in the request; and
wherein executing the qualified events includes:
executing the qualified events corresponding to each of the at least one historical timeslot; and then
sequentially executing the qualified events corresponding to the current timeslot based on the event time code of the qualified events, in synchronization with the video time codes of the video stream.

17. The method of claim 14 wherein generating the visual representation as part of executing a qualified event includes modifying a visual representation at a time corresponding to the event time code.

18. The method of claim 14 wherein:
requesting stateful event data includes determining two or more timeslots based on the extracted video time code, including a current timeslot and at least one historical timeslot to form a list of request timeslots;
determining if any of the at least one historical timeslot has been previously requested, and if so, removing the previously requested historical timeslot from the list of request timeslots; and
identifying each of the timeslots in the list of request timeslots in the request; and
wherein executing the qualified events includes:
executing the qualified events corresponding to each of the at least one historical timeslot; and then
sequentially executing the qualified events corresponding to the current timeslot based on the event time code of the qualified events, in synchronization with the video time codes of the video stream.

* * * * *